United States Patent [19]

Llorach

[11] 4,296,735
[45] Oct. 27, 1981

[54] DEVICES TO EXPLOIT SOLAR ENERGY

[76] Inventor: Alfredo B. Llorach, 17-B Bellavista St., San Antonio Abad (Ibiza), Spain

[21] Appl. No.: 951,240

[22] Filed: Oct. 13, 1978

[30] Foreign Application Priority Data

Oct. 20, 1977 [ES] Spain .................................. 463.413
Sep. 22, 1978 [ES] Spain .................................. 473.620

[51] Int. Cl.³ .......................... F24J 3/02; G02B 11/04; G02B 5/08
[52] U.S. Cl. ..................................... 126/438; 350/63; 350/299; 126/439; 126/449
[58] Field of Search ............... 126/451, 438, 437, 433, 126/449, 439; 136/89; 350/294, 299, 302, 307, 63, 292, 296, 293

[56] References Cited

U.S. PATENT DOCUMENTS

| | | | |
|---|---|---|---|
| 1,919,561 | 7/1933 | Kögel | 350/292 |
| 3,884,217 | 5/1975 | Wartes | 350/299 |
| 3,934,573 | 1/1976 | Dandini | 126/438 |
| 4,034,737 | 7/1977 | Kume | 126/438 |
| 4,134,391 | 1/1979 | Mahdjuri | 126/443 |
| 4,136,925 | 1/1979 | Menzies | 350/63 |
| 4,138,897 | 2/1979 | Moore | 350/292 |
| 4,149,521 | 4/1979 | Fletcher | 350/299 |
| 4,150,663 | 4/1979 | Sisson | 350/299 |
| 4,153,041 | 5/1979 | Grauleau | 126/443 |

Primary Examiner—Samuel Scott
Assistant Examiner—G. Anderson
Attorney, Agent, or Firm—McGlew and Tuttle

[57] ABSTRACT

An improved solar collector comprises a plurality of concave reflecting elements, each of the reflecting elements being disposed adjacent to another reflecting element to define a panel, each of the reflecting elements having an identical reflecting surface with a focal point, the focal points of each other reflecting surface being arranged to not coincide, a solar radiation absorbing element having an absorbing surface disposed on the focal point of each of the elements, fluid connections for directing a fluid medium through the radiation absorbing element to convey heat from the absorbing element, each of the reflecting elements having a periphery defined by a projection of a polygon so that the periphery of all of the reflecting elements match their adjacent counterpart, the concavity of each of the adjacent elements contacting each other along the periphery of each polygon, the total surface area of the reflecting surface of the elements not being less than the area defined by the periphery of the panel, the concavity of each of the reflecting elements being defined by a predetermined curvature to achieve in the solar beam reflection a focal zone above the reflection surface thereof due to the course of the sun, and the absorbing surface of the absorbing element being coincident with the focal zone.

6 Claims, 15 Drawing Figures

DEVICES TO EXPLOIT SOLAR ENERGY

The present invention relates to improvements in devices for exploiting solar energy.

DESCRIPTION OF THE PRIOR ART

Nowadays, solar devices are generally made up of "solar panels", whereby somewhat low use-temperatures are reached, their possibilities being thus greatly restricted.

Similar devices are also known that consist of an assembly of various parts or devices, with a view to respectively capture and absorb solar energy, to follow the energy source in its tracks (=sun trajectory), and to store and use the collected sun energy.

Such solar devices are made up, as, for instance, as in Spanish Patent 454.576, of a concave reflecting surface element which, placed facing the sun, concentrates the energy onto a focal point, wherein a collector to absorb the sun's radiation is placed, and whose absorbed heat is conveyed to a fluid which flows through said collector by means of suitable conduits.

In the known static or fixed, or else limited movement, reflecting surface devices, and according to the seasons of the year, the following defects are produced:

When these reflecting surfaces are made up of revolving surfaces, the sun beams reflect many times on them; thereby truly important heat losses are incurred (e.g., in the case of semispherical, Trombe-Mainel, and other, surfaces);

If the surfaces are cylindrical in shape, with a parabolic, circular, or any other curved shape base, their inability to achieve a high concentration ratio, a must if high temperatures are to be reached, may be singled out of their other disadvantages to illustrate their flaws.

Nor do the so-called Archymede-Russell uneven-surfaced mirrors solve the problem, these being further handicapped by the loss of reflecting surface due to the partial overlapping of their components.

SUMMARY OF THE INVENTION

So as to obtain a higher performance, and thus widen the scope of use of such devices, this invention provides a device whereby high temperatures are achievable said device being made with simple and highly efficient elements and means, their success further assured by their special structural arrangement.

The subject-matter improvements bear upon the following parts of said devices:

(1) Shape and makeup of reflecting surfaces;
(2) Sun radiation collector structure;
(3) Incorporation of reflecting-surface washing means.

To better explain this invention, the drawings illustrate some embodiments to disclose the import of said invention. These are shown only to the purposes of illustration and are not to be construed in any way as exhausting the embodiment possibilities.

BRIEF DESCRIPTION OF THE DRAWINGS

In these drawings.

DETAILED DESCRIPTION OF THE PREFERRED EMBODIMENTS

Figure 1:
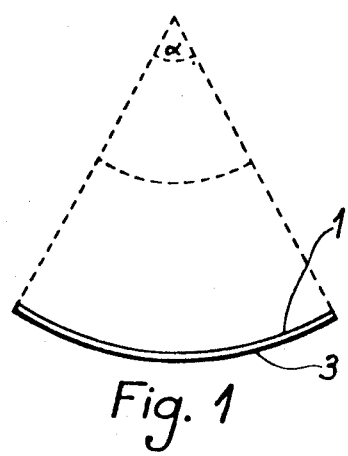
FIG. 1 is a sectional view of a reflecting element constructed in accordance with the invention.
Figure 2:
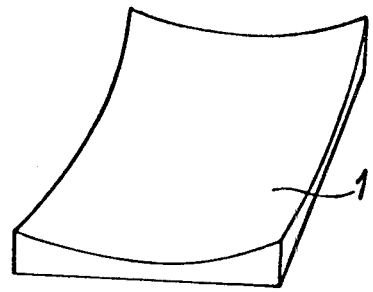
FIG. 2 is a top front perspective view of the elements shown in FIG. 1.
Figure 3:
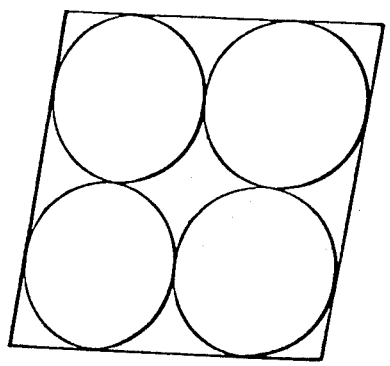
FIG. 3 is a perspective view of a group of reflecting elements as shown in Spanish Patent No. 454,576.
Figure 4:
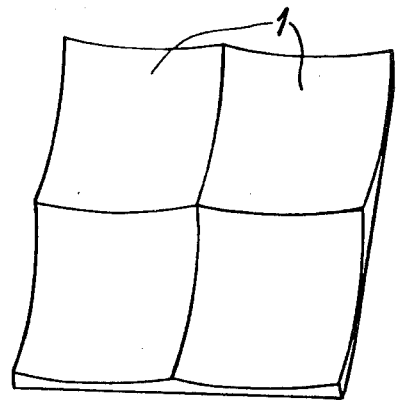
FIG. 4 is a perspective view of a group of reflecting elements according to the invention.

Concerning the improvements in reflecting surface configuration, both the static and mobile concave reflecting surfaces, so as to obtain the highest reflection performance for a given surface area while not losing useful surface, are made up by concave elements -1- (FIG. 1) provided with a convenient solid angle α; a polygon (a square in the example) is inscribed within said element, and the latter is cut along the projection lines of the polygon sides upon it, thus obtaining elements such as those shown in FIG. 2, so that the sides of the said concave element after being thus cut match their adjacent counterparts, without, total measurements being equal, any loss of reflecting surface (cf. FIG. 3 to FIG. 4).

In case of static reflecting surfaces, the reflecting assembly forms a sort of panel with concavities intersecting one another along the projections of the sides of the chosen polygon (a square in this instance).

Figure 5:
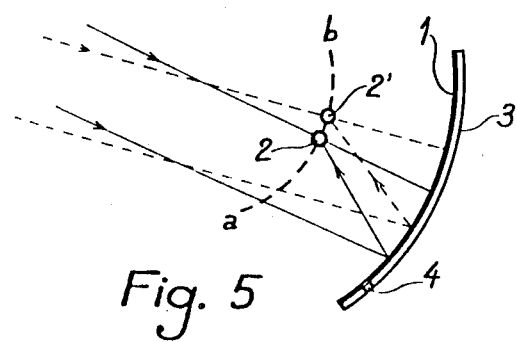
FIG. 5 is a schematic diagram of an operation of a reflecting element.

Every concavity projects the light received on its surface towards a focal point -2-(FIG. 5). The location of the focal point changes according to the incidence angle of sunlight upon the general surface of the panel. Thus, a displaced focal point-2'- is located on an imaginary spherical cup -a-b- which is concentric to the reflecting cup, its radius being one half thereof, in accordance with the general principles of optics.

For the protection of the mirror surface any transparent type of protection 3 may do, for example, varnish, plastic sheet, etc. The reflecting panel itself may also be made of transparent material such as glass, plastics, etc., metal-coated on the underside and subsequently protected with a suitable weatherproofing material, thus safeguarding the high performance of the reflecting surfaces -1-.

A hole -4- provided at the bottom of the concave reflecting element, allows for automatic drainage of water and snow.

An advantageous variation of the reflecting surface of the subject device shows a particular feature whereby it determines, instead of a focal point, a zone or spot of the reflected solar beam, notwithstanding the incidence angle of said beam (provided that it is within the predetermined acceptance angle).

This focal zone, logically enough, may expose any desired surface area, so as to achieve in all circumstances the preestablished concentration ratio.

The situation and course of the focal zone will be different, depending on the foreseen design for the reflecting surface, due to the various sun beam incidence angles.

Figure 8:
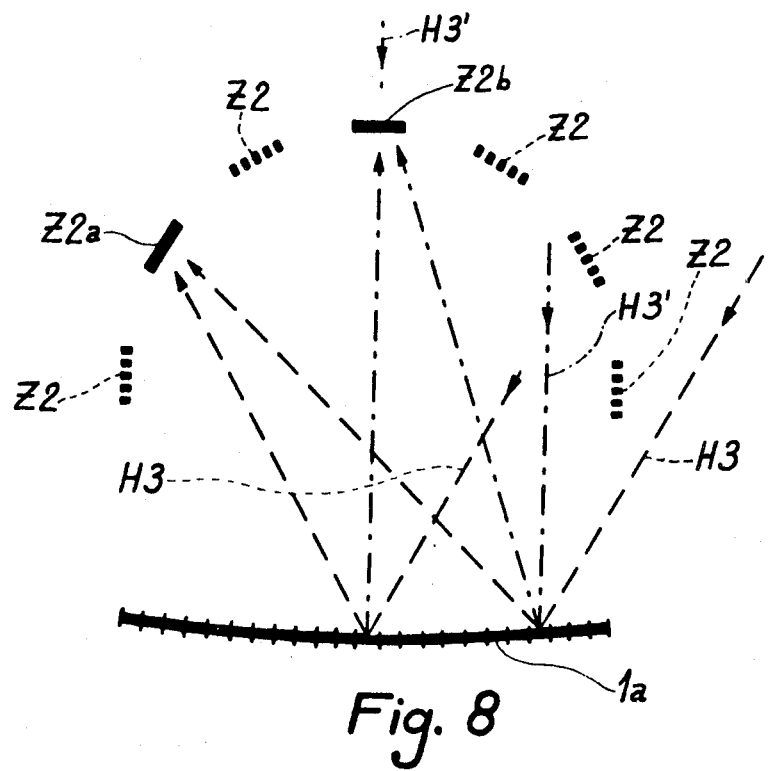
FIGS. 8 and 9 are schematic representations showing variations of the reflecting surface constituting bearing indications of various sun radiation incidence angles.

Thus, in FIG. 8, according to the constitution of the reflecting surface -1a- the path or course of the focal zone -Z2- will be semicircular. This focal zone will reflect on point -Z2a, for instance, when solar beam -H3- strikes upon the reflecting surface with a 30° angle, and on point -Z2b- when beam -H3'- falls with a 0° angle, i.e., without tilt.

Figure 9:
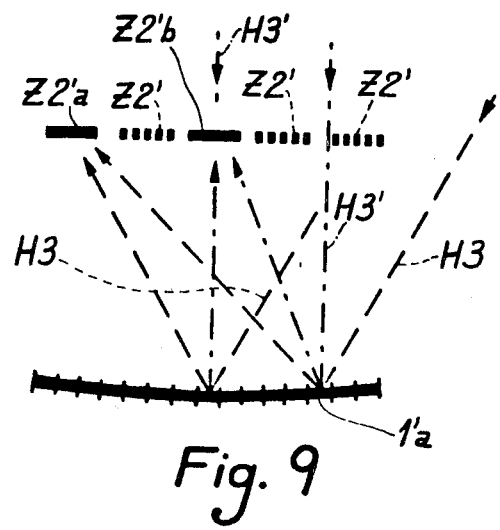

According to the constitution of the reflecting surface -1'a- of FIG. 9, the path of focal zone -Z2'- will be straight.

It is understood that this focal zone path may show any other direction according to the constitution of the reflecting surface, which shall be done in accordance with the most suitable means which determine the movement of the collector which shall follow the path of said focal zone.

Determination of the matrix curve to achieve a desired revolving reflecting surface will be made by finding the successive geometric points which answer to the above conditions, be it by means of diagrams, the relevant mathematical analysis, or by any other process deemed fit. These points will determine a curve having the desired features and properties, and the revolving surface obtained therefrom will be endowed with the requisite optical properties shown in FIGS. 8 and 9.

Figure 6:
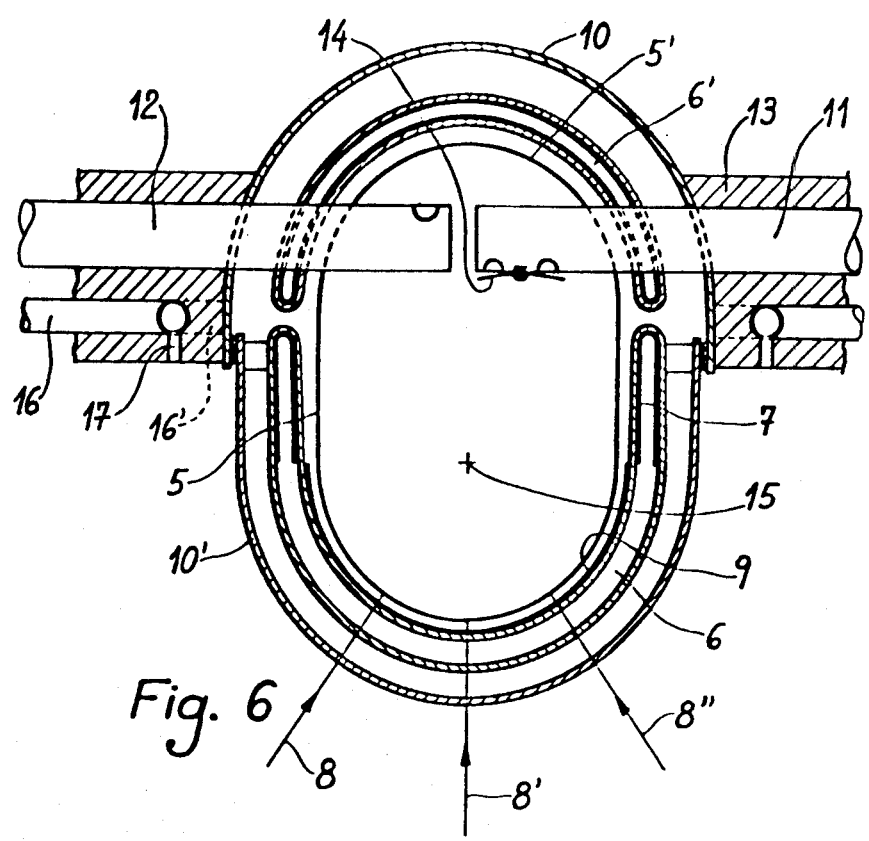
FIG. 6 is an enlarged sectional view of a sun radiation collector constructed in accordance with the invention.

Concerning the improvement of the sun radiation collector structure, in order to increase thermal yield of the assembly and prevent losses through reflection, radiation, convection and transmission from the collector, the collector is made up (FIG. 6) by collector -5- proper, plus a number of elements which largely prevent the collected heat leaking away. The basic principle is to insulate the collecting section, i.e., the one receiving a beam of radiation from the reflecting element, by means of a double, transparent, wrapping -6-, within which a vacuum has been created to avoid losses through convection and transmission. Said wrapping features inside itself a quicksilver coating -7- on those parts not receiving the light beam 8, 8', 8'', . . . similar to the lining of a Dewar vessel, and a reflecting coating -9-, selective to the higher wavelength (infra-red) radiations, but transparent for short (visible light and ultraviolet) waves, inside the described part of the wrapping, which receives the reflector-concentrated radiation beam. The collector -5-, a good conducting element with radiation absorbing coating (black body), is lodged inside and heat-protecting wrapping, its non-active part -5'- being also protected by a Dewar element -6'- to avoid caloric loss. These heat-protecting elements, made generally of glass, are suitably protected by a resistant outer wrapping -10- featuring a transparent part -10'- on its side exposed to the reflected solar beam. Suitable openings, both in the wrappings and in the heat-protecting (Dewar element) wrappings allow for the passage of conduits -11- and -12-, duly insulated against heat loss by insulation -13-, for the adequate conveying to and from the heat collector -5- of the heat-bearing fluid. Inside said collector, a thermostatic element may be lodged to allow the passage of the heat-bearing fluid once it has reached the temperature as regulated by said thermostatic element.

In order to avoid loss through reflection of the incident beam on the collector, the latter -5-, and its attendant transparent wrappings -6- and -10'- are spherically shaped on their parts exposed to the reflected beam, each wrapping being concentric as relates to a center -15- which coincides throughout with the focal point to which the reflected rays of the relevant concave elements are directed, in such a way that, for any given position of the source, the reflected rays are perpendicular to the transparent elements, and to the radiation-absorbing one, the losses through reflection being thus kept to a minimum.

In this way, the described wrapping acts as a veritable heat trap allowing the entry of the radiations which, on incidence upon the black body, are transformed into heat, while preventing their leaking away through convection and transmission thanks to modified Dewar linings, their radiation being also kept in check as heat is again reflected upon the black body by means of the selective reflecting coating -9-.

As concerns the heat-bearing fluid, it may carry heat-absorbing elements in suspension or solution, such as graphite or lamp black, or any other elements, or it may be itself made up by a fluid showing black body properties, so that the radiation-absorbing black body may be the fluid itself, entailing therefore a lesser heat loss, as transformation of incident light is made within the fluid itself; in this case, the heat collector -5-, in its part exposed to the reflected beam, will have a heat-resistant, transparent part in lieu of the absorbing part, so that the light beam may be absorbed and transformed into heat by the absorbing fluid which passes through the collector, said fluid acting then directly as a black body.

The tracking of the source and focusing of the radiation collectors and/or reflectors, may be carried out, for instance, by means of photosensitive elements.

Another improvement brought by this patent is the incorporation of washing means for the reflecting surfaces; these means consist, to greater advantage, of placing a pipe -16- (FIG. 6) inside the insulation -13- itself of conduits -11- and -12-, which pipe adopts a ring-like shape (16) around the collector -5- and in which certain orifices -17- have been provided affecting as well to the insulation wrapping and through which the sprinkling irrigation on the reflecting surfaces of the concave elements is made.

Figure 7:
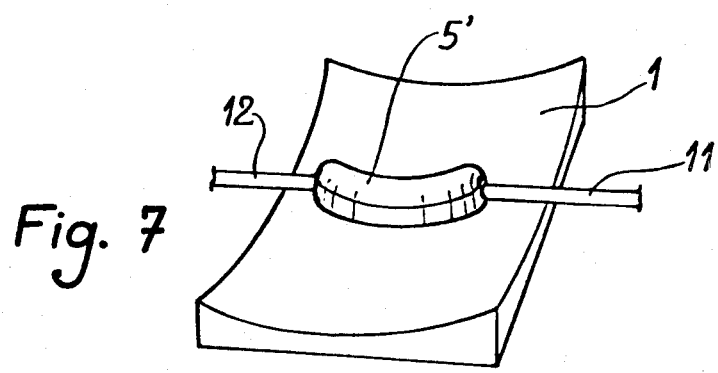
FIG. 7 is a perspective view of another embodiment of a radiation collector.

In FIG. 7, another embodiment is shown in which both the reflecting element -1- and the collector -5'- are static, in whose case this collector adopts a warped oblong shape concentric as regards said concave element, and on whose ends the conduits -11- and -12- are connected.

Figure 10:
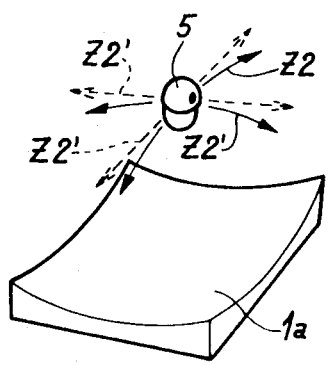
FIGS. 10 and 11 are views similar to FIG. 7 of other embodiments of the invention.
Figure 11:
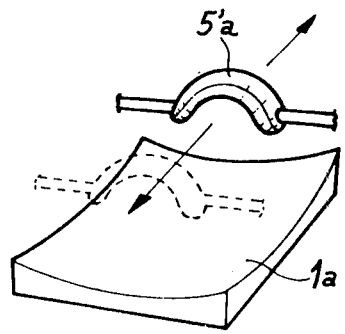

Concerning the reflecting surface variant -1a- shown in FIGS. 10 and 11, the collector -5- may be advantageously installed in a mobile arrangement according to the convenient direction, in accordance with the features of the reflecting surface, either with an arched path -Z2- as the focal zone, or with a straight one -Z2'- (FIG. 10).

FIG. 11 shows the case where the collector -5a- would rather be had with movement only in acordance with the seasons of the year, so as to correct the position of the collector to suit the variations in the sun positions through its yearly course. In this case, the collector will feature an oblong shape which will encompass the focal zone path during the day movement of the sun, said shape to depend too on the type of reflecting surface chosen.

Figure 14:
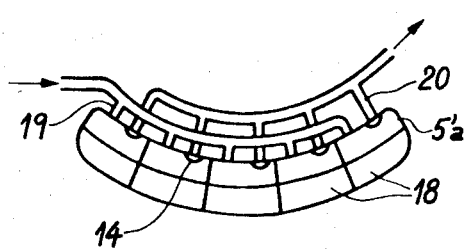
FIGS. 14 and 15 show respective cross sectional and longitudinal sectional views of another embodiment of a solar energy collector.
Figure 15:
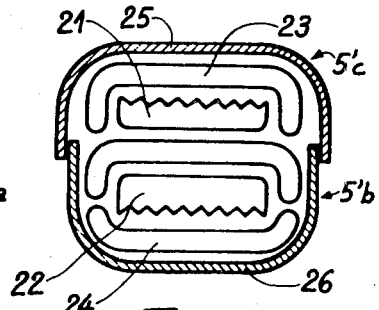

This collector -5'a- will feature as well a similar structure to collector -5-; however, and in order to increase its efficacity, it is advantageous to partition the inside of said collector with a view to divide it into a series of juxtaposed cell-like compartments -18- which progressively receive the action of the focal zone. Each of these cells will feature an entry -19- and an exit -20- (the entry fitted with a thermostatic valve -14-) for the heat bearing fluid, so that the focal zone projected by the reflecting surface shall have to heat a lower amount of said fluid, which will translate into a speedy achievement of high temperatures in same (FIG. 14).

Figure 13:
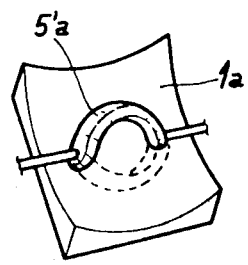

In FIG. 11 the seasonal movement of the collector -5'a- is made following a straight line, and in FIG. 13, said movement follows an arched one, all this being carried out according to the specific function chosen for every reflecting surface design -1a-.

Figure 12:
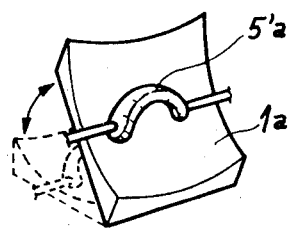
FIGS. 12 and 13 are views similar to FIG. 11 of still other embodiments of the invention.

Further, this movement of collector -5'a- relative to the focal zone so as to track the variation of the sun movement in the various seasons of the year can be obtained by balancing of the reflector-collector assembly (FIG. 12).

Lastly, when the reflector and collector are both wholly static, the surface constitution of the collector must cover the likely situations of the focal zone during the sun movement throughout the year. In this case, collector -5'b-, even if it may show a structure equal to that shown for collector -5'a-, will have a higher surface area and therefore it will be exposed to a wider direct sun radiation zone.

This circumstance is taken advantage of to obtain a preheating of the heating fluid, and to this effect another collector -5'c- is arranged on top of the other, the former comprising a black absorbing body -21- exposed to direct sun radiation, and placed in the face opposite the absorbing body -22- which receives the beam reflected by the reflecting surface, whose black body -21- will be insulated by means of a Dewar vessel -23- similar to that one -24- which insulates the black body -22-, that assembly being as well protected with a transparent cover -25- similar to cover -26- of collector -5'b-. With this arrangement, the heat-bearing fluid, preheated in collector -5'c-, is introduced through adequate media into collector 5'b-, in its absorbing body -22-.

What I claim is:

1. An improved solar collector comprising, in combination, a plurality of concave reflecting elements, each of said reflecting elements being disposed adjacent to another reflecting element to define a panel, each of said reflecting elements having an identical reflecting surface with a focal point, said focal point of each other reflecting surface not coninciding, a solar radiation absorbing element having an absorbing surface disposed on said focal points of each of said elements, means for directing a fluid medium through the radiation absorbing element to convey heat from said absorbing element, each of said reflecting elements having a periphery defined by a projection of a polygon so that the periphery of all the reflecting elements match the periphery of their adjacent reflecting elements, the concavity of each of said adjacent elements contacting each other along the periphery of each polygon, the total surface areas of the reflecting surface of said elements not being less than the area defined by the periphery of said panel, the concavity of each of said reflecting elements being defined by a predetermined curvature to achieve in the solar beam reflecting a focal zone above the reflection surface thereof due to the course of the sun, and said absorbing surface of said absorbing element being coincident with said focal zone.

2. The improved solar collector as set forth in claim 1 further comprising a Dewar-type transparent wrapping surrounding said absorber element, said wrapping including a selective reflective coating adjacent to the absorbing surface which passes visible light and ultraviolet radiation and reflects infra-red radiation, and a silvery lining adjacent the surfaces other than said absorbing surface.

3. The improved solar collector as set forth in claim 1 wherein each of said reflecting elements includes a hole at the bottom of the concavity extending from its respective reflecting surface to drain liquid.

4. The improved solar collector as set forth in claim 1 wherein said absorbing element is static, said absorbing element having an arched oblong shape and being concentric to said respective reflecting surface.

5. The improved solar collector as set forth in claim 1 wherein said absorbing element is static, said absorbing element having an absorbing surface portion directly exposed to the sun, and superimposed onto said absorbing surface receiving radiation from said reflecting elements, the fluid medium directing means passing through said absorbing surface portion downstream of said absorbing surface.

6. The improved solar collector as set forth in claim 5, wherein said absorbing element comprises an inner side partitioned by means of juxtaposed cells arranged in the direction of the sun's path, and having independent entry and exit for a heat bearing fluid, thereby obtaining a speedier heating and a low amount of the fluid being exposed in any one time.

* * * * *